(12) United States Patent
Sandell

(10) Patent No.: US 10,305,566 B2
(45) Date of Patent: May 28, 2019

(54) METHODS AND SYSTEMS FOR TRANSMITTING INFORMATION ACROSS A MIMO CHANNEL FROM A TRANSMITTER TO A RECEIVER

(71) Applicant: KABUSHIKI KAISHA TOSHIBA, Tokyo (JP)

(72) Inventor: Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/504,607

(22) PCT Filed: Feb. 4, 2015

(86) PCT No.: PCT/GB2015/050305
§ 371 (c)(1),
(2) Date: Feb. 16, 2017

(87) PCT Pub. No.: WO2016/124876
PCT Pub. Date: Aug. 11, 2016

(65) Prior Publication Data
US 2017/0373742 A1    Dec. 28, 2017

(51) Int. Cl.
*H04B 7/04* (2017.01)
*H04B 7/06* (2006.01)
(Continued)

(52) U.S. Cl.
CPC ......... *H04B 7/0626* (2013.01); *H04B 7/0434* (2013.01); *H04B 7/0439* (2013.01); *H04W 52/367* (2013.01)

(58) Field of Classification Search
CPC .. H04B 7/0413; H04B 7/0434; H04B 7/0452; H04B 7/0456; H04B 7/0478;
(Continued)

(56) References Cited

U.S. PATENT DOCUMENTS 8,442,142 B2    5/2013    Ojard et al.
8,649,796 B2 *  2/2014    Zirwas ................. H04W 24/00
                                                     455/452.1

(Continued)

OTHER PUBLICATIONS

International Preliminary Report on Patentability and Written Opinion issued by the International Bureau of WIPO dated Aug. 17, 2017, for International Appl. No. PCT/GB2015/050305.
(Continued)

*Primary Examiner* — David S Huang
(74) *Attorney, Agent, or Firm* — Finnegan, Henderson, Farabow, Garrett & Dunner, L.L.P.

(57) ABSTRACT

A method of transmitting a plurality of data streams across a MIMO channel from a transmitter to a receiver, the transmitter comprising an array of antennas, the method comprising acquiring channel state information for a plurality of subcarrier frequencies, determining a mapping that defines, for each frequency, how each data stream is to be mapped to each antenna in the array, and for each antenna in the array, adjusting the power allocated to each data stream that is to be transmitted from the antenna, so as to maximize a measure of throughput; wherein for each data stream, the power allocated to transmitting that data stream at each frequency is greater than or equal to zero, and for each frequency, the power transmitted by any one antenna does not exceed a threshold, and for each data stream, the same power is allocated to each subcarrier used for transmitting that data stream.

11 Claims, 4 Drawing Sheets

(51) Int. Cl.
*H04W 52/36* (2009.01)
*H04B 7/0426* (2017.01)

(58) Field of Classification Search
CPC ..... H04B 7/0658; H04B 7/066; H04L 1/0687; H04L 1/0693; H04L 25/0206; H04L 5/0037; H04L 5/006
See application file for complete search history.

(56) References Cited

U.S. PATENT DOCUMENTS

| | | | |
|---|---|---|---|
| 2009/0207829 A1* | 8/2009 | Peng | H04L 5/0023 370/344 |
| 2010/0202431 A1* | 8/2010 | Kazmi | H04B 7/0426 370/342 |
| 2010/0266054 A1 | 10/2010 | Mielczarek et al. | |
| 2011/0131461 A1* | 6/2011 | Schulz | H04L 1/1819 714/749 |

OTHER PUBLICATIONS

Zhao et al., "Optimizing Sum-Capacity Through Power Allocation for SLNR-precoding-based Cognitive Networks," Asia Pacific Conference on Communications, IEEE (Oct. 2012), pp. 927-932.
Boccardi et al., "Zero-Forcing Precoding for the MIMO Broadcast Channel Under Per-Antenna Power Constraints," IEEE $7^{th}$ Workshop on Signal Processing Advances in Wireless Communications (Jul. 2006), 5 pages.
Tosato et al., "Codeword based power loading in MU-MIMO," Workshop on Novel Waveform and MAC Design for 5G (Jun. 4, 2016), 6 pages.

* cited by examiner

METHODS AND SYSTEMS FOR TRANSMITTING INFORMATION ACROSS A MIMO CHANNEL FROM A TRANSMITTER TO A RECEIVER

FIELD

Embodiments described herein relate to methods and systems for transmitting information across a MIMO channel from a transmitter to a receiver.

BACKGROUND

MIMO (Multiple Input Multiple Output) precoding is an efficient method for increasing system capacity in radio communication systems that comprise an array of transmitting antennas and/or receiving antennas. MIMO precoding requires that knowledge of the channel quality between the transmitter and the receiver is available at the transmitter. In a time-division duplex (TDD) system, knowledge of the channel quality can be acquired through measurements of the reciprocal channel; in a frequency-division duplex (FDD) system, feedback from the receiver may be used. The precoding technique can be used for both single-user MIMO systems in which there is only one receiver, and multiuser MIMO systems in which there are multiple receiver antennas that share the available frequency-time resources by being spatially multiplexed.

When implementing a MIMO communications link, it is possible to impose the restriction that all transmitting antennas have the same power. Doing so is advantageous since it can help to improve the performance of power amplifiers, for example. However, applying this constraint carries a drawback that numerical methods may then be required in order to determine the precoding for each transmitting antenna. Such numerical methods can increase the computational burden on the transmitter, this being particularly true in OFDM systems where a precoder must be computed for each individual subcarrier.

One solution for reducing the computational complexity is to group neighbouring subcarriers together and compute a single precoder for them. However, such an approach can lead to interuser interference and resultant performance degradation, since the precoder will not be ideally matched to each individual subcarrier.

BRIEF DESCRIPTION OF DRAWINGS

Embodiments will now be described by way of example with reference to the accompanying drawings in which.

DETAILED DESCRIPTION

Figure 1:
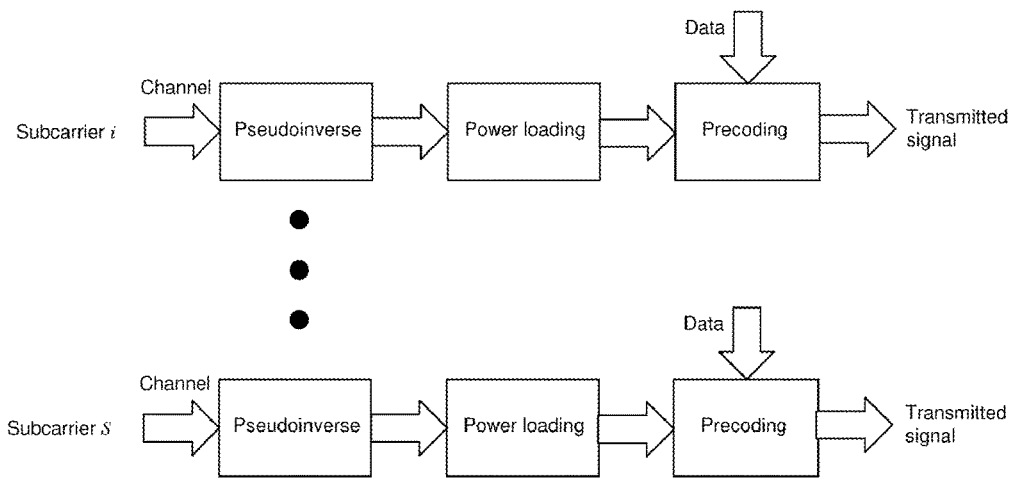
FIG. 1 shows a schematic of a conventional method for MIMO precoding in an OFDM system.

According to a first embodiment, there is provided a method of transmitting information across a MIMO channel from a transmitter to a receiver, the transmitter comprising an array of antennas and the information comprising a plurality of data streams, the method comprising precoding the information prior to its transmission;

wherein precoding of the information comprises:
acquiring channel state information for the MIMO channel for each one of a plurality of subcarrier frequencies,
determining, based on the channel state information, a mapping that defines, for each subcarrier frequency, how each data stream is to be mapped to each antenna in the array;
defining a measure of data throughput for the MIMO channel; and
for each antenna in the array, adjusting the power allocated to each respective data stream that is to be transmitted from the antenna, so as to maximise the measure of throughput;
wherein the power is adjusted subject to the conditions that:
for any one data stream, the power allocated to transmitting that data stream at each subcarrier frequency is greater than or equal to zero; and
for each subcarrier frequency, the power transmitted by any one antenna at that subcarrier frequency does not exceed a threshold;
wherein, for each data stream, the same power is allocated to each subcarrier used for transmitting that data stream.

The data streams may be mapped across the array of antennas in such a way as to minimise interference between the data streams at the receiver.

In some embodiments, determining the mapping comprises determining a channel state matrix for each subcarrier frequency based on the channel state information.

In some embodiments, the method further comprises determining a pseudo-inverse matrix of the channel state matrix for each subcarrier frequency.

In some embodiments, the measure of throughput is the sum-rate of data transmission across all data streams or the largest possible minimum data rate for an individual data stream.

According to a second embodiment, there is provided a transmitter for establishing a MIMO channel for communicating information comprising a plurality of data streams to a receiver, the transmitter comprising:
an array of antennas; and
a precoder for precoding the information prior to its transmission by:
acquiring channel state information for the MIMO channel for each one of a plurality of subcarrier frequencies,
determining, based on the channel state information, a mapping that defines, for each subcarrier frequency, how each data stream is to be mapped to each antenna in the array;
defining a measure of data throughput for the MIMO channel; and
for each antenna in the array, adjusting the power allocated to each respective data stream that is to be transmitted from the antenna, so as to maximise the measure of throughput;

wherein the precoder is configured to adjust the power subject to the conditions that:
for any one data stream, the power allocated to transmitting that data stream at each subcarrier frequency is greater than or equal to zero; and
for each subcarrier frequency, the power transmitted by any one antenna at that subcarrier frequency does not exceed a threshold;
wherein, for each data stream, the precoder is configured to allocate the same power to each subcarrier used for transmitting that data stream.

The precoder may be configured to map the data streams across the array of antennas in such a way as to minimise interference between the data streams at the receiver.

The precoder may be configured to determine the mapping by determining a channel state matrix for each subcarrier frequency based on the channel state information.

The precoder may be configured to determine a pseudoinverse matrix of the channel state matrix for each subcarrier frequency.

In some embodiments, the measure of throughput is the sum-rate of data transmission across all data streams or the largest possible minimum data rate for an individual data stream.

According to a third embodiment, there is provided a non-transient computer readable storage medium comprising computer executable instructions that when executed by a computer will cause the computer to carry out a method according to the first embodiment.

It will be understood that the receiver itself may comprise an array of antennas. The plurality of data streams may be associated with different, respective users, or a single user; that is, a single user may receive multiple data streams at the receiver, or alternatively, there may be multiple users, each receiving one or more data streams at the receiver. The number of receive antennas per user will be at least as many as the number of data streams that the user is receiving.

FIG. 1 shows a schematic of a conventional method for MIMO precoding in an OFDM system. The precoding can be split into two steps: in the first step, the pseudoinverse of the channel is computed using a zero-forcing (ZF) approach in order to eliminate interuser interference; in the second step, power loading is applied in order to maximise some objective function, e.g. to achieve either a maximal sum-rate of the data streams or a largest possible minimum data rate. Each subcarrier is precoded separately by first computing the pseudoinverse and then applying the power loading.

An issue encountered with the above described method is that the power levels assigned to the different transmitting antennas may vary significantly, which is undesirable since such power fluctuations may cause problems with power amplifiers, for example. Conventionally, this problem has been addressed by using a ZF sum-rate precoder with per-antenna power control. This can be explained by considering a system that comprises N transmit antennas, K data streams (belonging to one or more users) and S subcarriers. Given the channel state matrix $H \in \mathbb{C}^{K \times N}$, the pseudoinverse $G = H^H(HH^H)^{-1} \in \mathbb{C}^{K \times N}$ is first computed. The objective then is, for each subcarrier i=1, . . . S, to maximise the sum rate (across all data streams), with the constraint that the power in each transmit antenna n and subcarrier i is limited to P. The objective can be expressed as the following optimisation problem:

$$\max_{\{p_k^{(i)}\}_{k=1}^K} \sum_{k=1}^K \log_2(1 + p_k^{(i)})$$

-continued $$\text{s.t.} \begin{cases} p_k^{(i)} \geq 0 \\ \sum_{k=1}^K |G_{n,k}^{(i)}|^2 p_k^{(i)} \leq P \end{cases}, n = 1, \ldots, N, i = 1, \ldots, S$$

where $p_k^{(i)}$ is the power on the $k^{th}$ stream and the $i^{th}$ subcarrier and $G_{n,k}^{(i)}$ is the pseudoinverse ($H^{(i)}G^{(i)} = I_K$) on the $i^{th}$ subcarrier, indicating how the $k^{th}$ data stream is mapped to the $n^{th}$ transmit antenna. By deriving the pseudoinverse matrix for each subcarrier frequency, it is possible to determine a respective group of antennas to use in transmitting each data stream and to determine, for each one of the antennas in the respective group, which subcarrier frequencies are to be used for transmitting symbols in the data stream.

The optimisation can be written as S separate problems, which can be solved independently. If $x_k^{(i)}$ is the $k^{th}$ data symbol on the $i^{th}$ subcarrier, the transmitted signal on the $n^{th}$ antenna and $i^{th}$ subcarrier will be:

$$s_n^{(i)} = \sum_{k=1}^K G_{n,k}^{(i)} \sqrt{p_k^{(i)}} x_k^{(i)}$$

$$s^{(i)} = G^{(i)} \sqrt{P^{(i)}} x^{(i)}$$

$$s^{(i)} \in \mathbb{C}^N, G^{(i)} \in \mathbb{C}^{N \times K}, P^{(i)} \in \mathbb{C}^{K \times K}, x^{(i)} \in \mathbb{C}^K$$

$$P^{(i)} = \text{diag}(p_1^{(i)}, \ldots, p_K^{(i)}).$$

This ensures that a (nonnegative) power $p_k$ is assigned to each stream k such that the transmit power per antenna is not larger than a prescribed level P. The method must be performed separately for all subcarriers, as illustrated in FIG. 1.

If N>K (i.e. there are more transmit antennas than data streams), the extra degree of freedom can be exploited to further enhance the performance. In this case, the pseudoinverse is not unique and can be written as $G = H^+ + VC$, where $H^+ = H^H(HH^H)^{-1} \in \mathbb{C}^{K \times N}$ and $V \in \mathbb{C}^{K \times N}$ is the nullspace of H, i.e., HV=0, and $C \in \mathbb{C}^{K \times N}$ is an arbitrary matrix; this ensures that HG=I.

Figure 2:
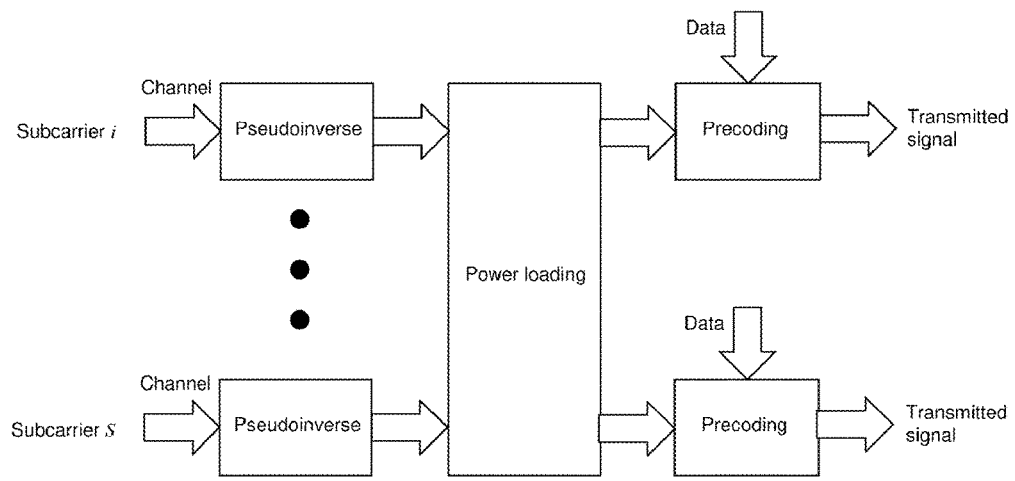
FIG. 2 shows a schematic of a method for MIMO precoding in an embodiment.

In contrast to the conventional method discussed above, in embodiments described herein, the pseudoinverses are computed separately for each subcarrier but a joint power loading is applied to all S subcarriers in a group of subcarriers; this is shown pictorially in FIG. 2. It is possible to apply a joint power loading to a group of subcarriers because the channel is not likely to change significantly between subcarriers in the group and so the optimal power loading for those subcarriers is also likely to be quite similar.

In more detail, the power loading for the data stream k is assumed to be the same for all subcarriers in the group i.e. $p_k^{(i)} = p_k$. The sum-rate (across all streams and carriers) is maximised with the constraint that the power in each transmit antenna is limited to P. This optimisation can be expressed as:

$$\max_{\{p_k^{(i)}\}_{k=1}^K} \sum_{k=1}^K \log_2(1 + p_k^{(i)}) = S \max_{\{p_k\}_{k=1}^K} \sum_{k=1}^K \log_2(1 + p_k)$$

-continued $$\text{s.t.} \begin{cases} p_k^{(i)} \geq 0 \\ \sum_{k=1}^{K} |G_{n,k}^{(i)}|^2 p_k^{(i)} \leq P \end{cases}, n = 1, \ldots, N, i = 1, \ldots, S$$

Thus, the optimisation is a joint optimisation for all S subcarriers. The transmitted signal on the $n^{th}$ antenna and $i^{th}$ subcarrier will be:

$$s_n^{(i)} = \sum_{k=1}^{K} G_{n,k}^{(i)} \sqrt{p_k} x_k^{(i)}$$

$$s^{(i)} = G^{(i)} \sqrt{P} x^{(i)}$$

$$s^{(i)} \in \mathbb{C}^N, G^{(i)} \in \mathbb{C}^{N \times K}, P \in \mathbb{C}^{K \times K}, x^{(i)} \in \mathbb{C}^K$$

$$P = \text{diag}(p_1, \ldots, p_K).$$

Since each subcarrier in the group uses its own pseudo-inverse, interuser interference can be reduced or eliminated. In turn, use of the joint power loading means that the optimisation problem becomes much simpler since there are fewer variables to optimise over. It will be understood that the same principle (individual linear filters and joint power loading) can be applied to other scenarios as well, e.g., when maximising the minimum data rate over the streams.

Figure 3:
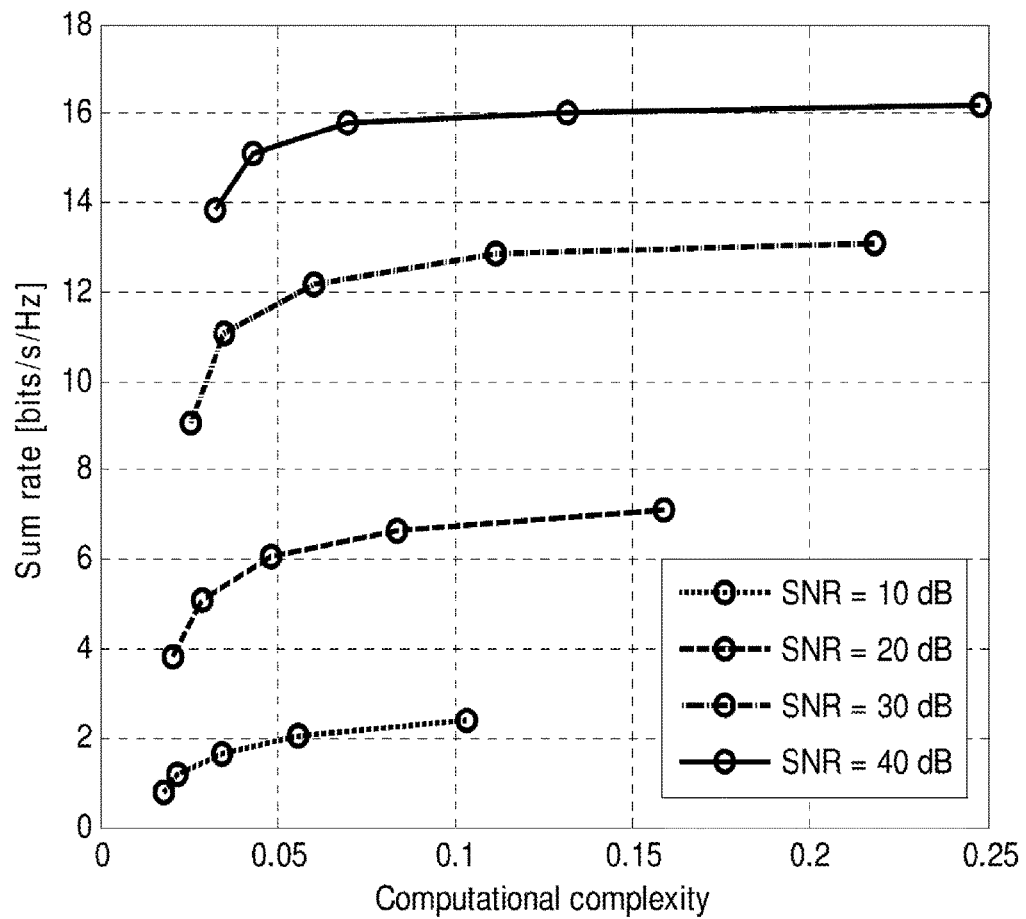
FIG. 3 shows results of a simulation indicating how increasing the sum rate of data transmission in a MIMO system incurs a greater computational burden in terms of computing a suitable precoding, for different signal to noise ratios.
Figure 4:
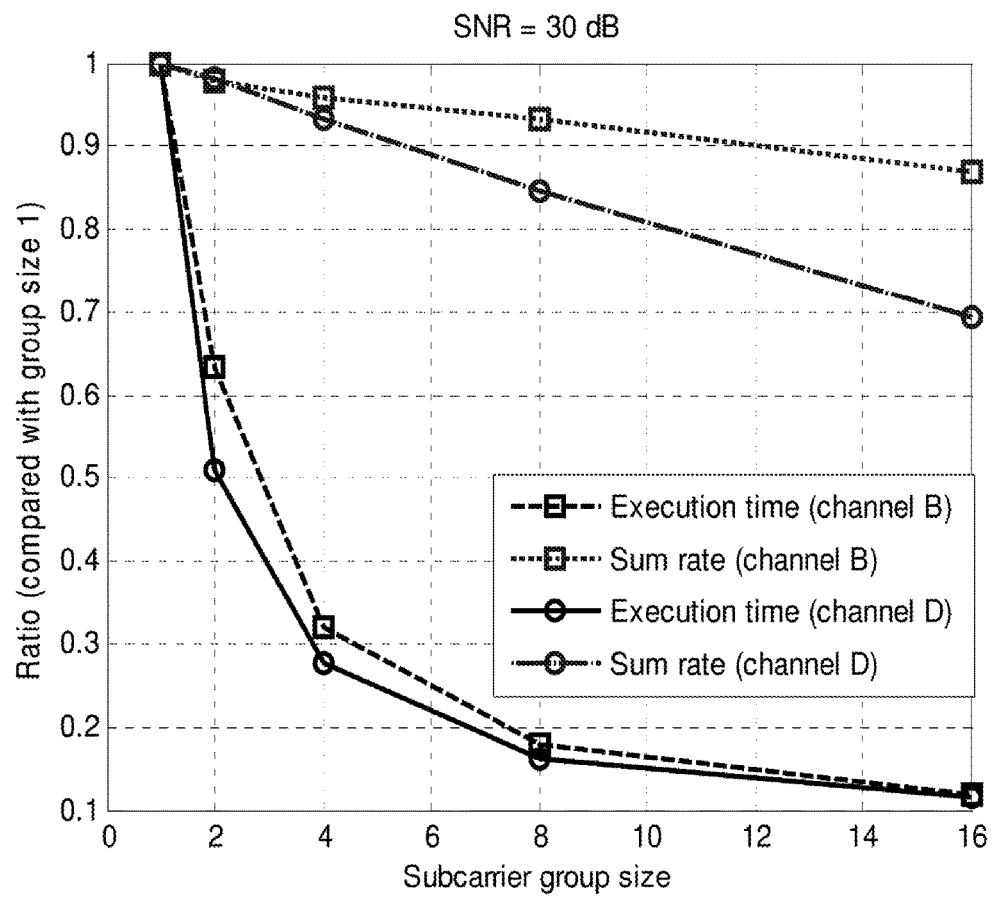
FIG. 4 shows results of a simulation of how both the relative sum rate of data transmission and time taken to execute the precoding vary as a function of the number of subcarriers in each group to which precoding is applied, in accordance with an embodiment.

In what follows, the performance of an embodiment will be illustrated by considering an OFDM system with 64 subcarriers, N=4 transmit antennas and K=4 data streams. Since it is difficult to estimate the complexity of numerical optimisation, the complexity will be modeled based on the average execution time of the software package MATLAB's™ function fmincon; this is an efficient implementation which reflects the computational complexity of finding the optimal precoder. By varying the group size, it is possible to plot the sum-rate as a function of computational complexity. FIG. 3 shows such a plot for the IEEE802.11ax channel model B. As expected the performance improves with a larger complexity (smaller group size) but there are diminishing returns, meaning that there is a trade-off between performance and complexity. The trade-off is further illustrated by FIG. 4, in which the ratio of the sum-rate for a system with and without grouping is shown as a function of group size. For channel model B (which is not very frequency selective) the degradation is very modest. On the other hand, the execution time is drastically reduced. Judging by these results, the drop in performance is only linear, whereas the complexity reduction achieved by implementing a method according to an embodiment is exponential. The same is true for more frequency-selective channel models, such as IEEE802.11ax channel model D, although the performance is reduced to a slightly greater extent.

Whilst the above described embodiments have each made use of a pseudoinverse matrix for determining the mapping of data streams to each antenna, it will be appreciated that regularised versions of the pseudoinverse (such as a minimum mean square error MMSE solution, for example) may also be used. In such a case, the interference between data streams may still be reduced (without being entirely eliminated), with a further reduction in the overall complexity of precoding.

Thus, embodiments described herein can provide a balance between performance and complexity.

Figure 5:
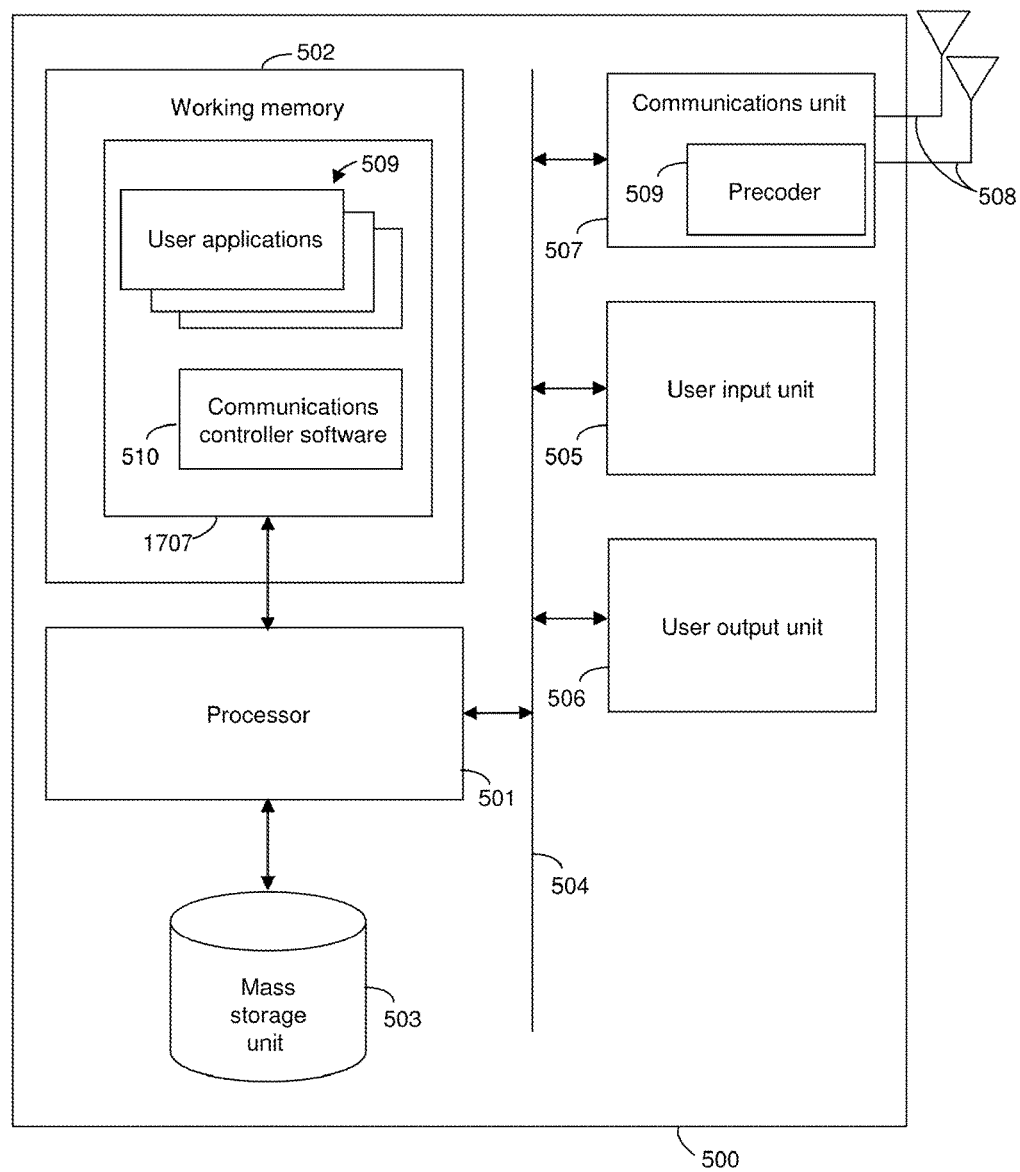
FIG. 5 shows an example of a communications device according to an embodiment.

FIG. 5 shows, schematically, a wireless communication device according to an embodiment. The wireless communication device 500 illustrated in FIG. 5 is generally capable of being used in a MIMO context, to establish a MIMO communications channel with one or more other devices and, in accordance with a specific embodiment of the invention, to perform precoding of data for transmission to those one or more other devices. The wireless communication device may transmit a plurality of data streams across the MIMO channel.

The reader will appreciate that the actual implementation of the wireless communication device is non-specific, in that it could be a base station or a user terminal. Depending on the particular implementation, the multiple data streams may be associated with different respective users and/or may be associated with different applications hosted by the device.

The device 500 comprises a processor 501 operable to execute machine code instructions stored in a working memory 502 and/or retrievable from a mass storage unit 503. By means of a general purpose bus 504, user operable input units 505 are capable of communication with the processor 501. The user operable input units 505 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals. User output unit(s) 506 are also connected to the general purpose bus 501, for the output of information to a user. The output unit(s) may take the form of audio/video output hardware devices including a visual display unit, a speaker or any other device capable of presenting information to a user.

Antennas 508 form a MIMO array for wireless transmission of data from the device. A communications unit 507 is connected to the general purpose bus 501 and to antennas 508. Communications unit comprises a precoder for precoding information to be transmitted using the MIMO array.

In the illustrated embodiment in FIG. 5, the working memory 502 stores user applications 509 which, when executed by the processor 501, cause the establishment of a user interface to enable communication of data to and from a user. The applications in this embodiment establish general purpose or specific computer implemented utilities that might habitually be used by a user.

Also stored in the working memory 502 is communications controller software 510, for establishing a communications protocol to enable data generated in the execution of one of the applications 509 to be processed and then passed to the communications unit for transmission. It will be understood that the software defining the applications 509 and the communications controller software 510 may be partly stored in the working memory 502 and the mass storage unit 503, for convenience. A memory manager could optionally be provided to enable this to be managed effectively, to take account of the possible different speeds of access to data stored in the working memory 502 and the mass storage unit 503.

In operation, the communications unit 507 receives, via the antennas 508, channel state information from the other device(s) that form the MIMO communication link (in some alternative embodiments, the channel state information may be obtained based on reverse-link estimation at the transmitter). The channel state information indicates the quality of channels between respective antennas 508 of the transmitter and the antennas of the other device(s) for different subcarrier frequencies, taking into account the effects of e.g.

scattering, fading and power decay between the transmitter and receiver. The channel quality may be expressed, for example, as a signal to noise SNR ratio or by any one of a number of metrics used in the art for this purpose. The channel state information may be updated at intervals. In accordance with embodiments previously described, the precoder is operable, on the basis of the channel state information, to determine a precoding to be used in transmitting the multiple data streams.

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

The invention claimed is:

1. A method of transmitting information across a MIMO channel from a transmitter to a receiver, the transmitter comprising an array of antennas and the information comprising a plurality of data streams, the method comprising precoding the information prior to its transmission;
    wherein precoding of the information comprises:
        acquiring channel state information for the MIMO channel for each one of a plurality of subcarrier frequencies,
        determining, based on the channel state information, a mapping that defines, for each subcarrier frequency, how each data stream is to be mapped to each antenna in the array;
        defining a measure of data throughput for the MIMO channel; and
        for each antenna in the array, adjusting the power allocated to each respective data stream that is to be transmitted from the antenna, so as to maximise the measure of throughput;
        wherein the power is adjusted subject to the conditions that:
            for any one data stream, the power allocated to transmitting that data stream at each subcarrier frequency is greater than or equal to zero;
            for each subcarrier frequency, the power transmitted by any one antenna at that subcarrier frequency does not exceed a first threshold; and
            for any one antenna, the power transmitted by the antenna does not exceed a second threshold, the second threshold being the same for each antenna;
            wherein, for each data stream, the same power is allocated to each subcarrier used for transmitting that data stream.

2. A method according to claim 1, wherein the data streams are mapped across the array of antennas in such a way as to minimise interference between the data streams at the receiver.

3. A method according to claim 1, wherein determining the mapping comprises determining a channel state matrix for each subcarrier frequency based on the channel state information.

4. A method according to claim 3, further comprising determining a pseudo-inverse matrix of the channel state matrix for each subcarrier frequency.

5. A method according to claim 1, wherein the measure of throughput is the sum-rate of data transmission across all data streams or the largest possible minimum data rate for an individual data stream.

6. A transmitter for establishing a MIMO channel for communicating information comprising a plurality of data streams to a receiver, the transmitter comprising:
    an array of antennas; and
    a precoder for preceding the information prior to its transmission by:
        acquiring channel state information for the MIMO channel for each one of a plurality of subcarrier frequencies,
        determining, based on the channel state information, a mapping that defines, for each subcarrier frequency, how each data stream is to be mapped to each antenna in the array;
        defining a measure of data throughput for the MIMO channel; and
        for each antenna in the array, adjusting the power allocated to each respective data stream that is to be transmitted from the antenna, so as to maximise the measure of throughput;
        wherein the precoder is configured to adjust the power subject to the conditions that:
            for any one data stream, the power allocated to transmitting that data stream at each subcarrier frequency is greater than or equal to zero;
            for each subcarrier frequency, the power transmitted by any one antenna at that subcarrier frequency does not exceed a first threshold; and
            for any one antenna, the power transmitted by the antenna does not exceed a second threshold, the second threshold being the same for each antenna;
            wherein, for each data stream, the precoder is configured to allocate the same power to each subcarrier used for transmitting that data stream.

7. A transmitter according to claim 6, wherein the precoder is configured to map the data streams across the array of antennas in such a way as to minimise interference between the data streams at the receiver.

8. A transmitter according to claim 6, wherein the precoder is configured to determine the mapping by determining a channel state matrix for each subcarrier frequency based on the channel state information.

9. A transmitter according to claim 8, wherein the precoder is configured to determine a pseudo-inverse matrix of the channel state matrix for each subcarrier frequency.

10. A transmitter according to claim 6, wherein the measure of throughput is the sum-rate of data transmission across all data streams or the largest possible minimum data rate for an individual data stream.

11. A non-transient computer readable storage medium comprising computer executable instructions that when executed by a computer will cause the computer to carry out a method according to claim 1.

* * * * *